Jan. 11, 1927.

B. E. LENEHAN 1,614,202

FREQUENCY METER

Filed June 6, 1924

WITNESSES:
R. J. Butler.
E. R. Evans

INVENTOR
Bernard E. Lenehan.
BY
Wesley G. Carr
ATTORNEY

Jan. 11, 1927.  B. E. LENEHAN  1,614,202

FREQUENCY METER

Filed June 6, 1924  2 Sheets-Sheet 2

WITNESSES:
R. J. Butler
E. R. Evans

INVENTOR
Bernard E. Lenehan.
BY
ATTORNEY

Patented Jan. 11, 1927.

1,614,202

UNITED STATES PATENT OFFICE.

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA.

FREQUENCY METER.

Application filed June 6, 1924. Serial No. 718,244.

My invention relates to instruments for indicating the frequency of alternating-current circuits and particularly to an instrument that is highly sensitive over a small range of frequency variation.

One object of my invention is to provide an instrument of this character in which a large deflection is obtained for a relatively slight change of frequency.

Another object of my invention is to provide a frequency meter in which the current is a minimum, in order that the power consumption shall be relatively small.

A further object of my invention is to provide a frequency meter having a parallel-resonance circuit in series with the movable coil, the inductance of the stationary coil preferably being utilized in the resonant circuit.

A further object of my invention is to provide a frequency meter comprising two relatively movable sets of coils and means for readily adjusting the instrument to obtain a desired deflection.

Since frequency meters are ordinarily required to indicate a comparatively slight variation of frequency from the normal value, it is essential that the instrument give a wide deflection for a slight variation; for instance,—1 or 2%. In accordance with my invention, this result is obtained by providing two relatively movable coils and connecting a parallel-resonance circuit in series with one of the coils, the circuit being tuned to the normal frequency of the instrument. The circuit of the other coil is inductive whereby the current is substantially 90° out of phase with the applied voltage.

At the normal frequency, the resonant circuit constitutes a high impedance and accordingly practically no current flows through the associated coil. Furthermore, the slight current in the said coil is approximately in phase with the applied voltage, and, therefore, 90° out of phase with the current in the other coil. Accordingly, no torque is exerted between the two coils.

Upon a slight change of frequency, however, both the phase and the magnitude of the current through the coil associated with the resonant circuit are considerably changed, thereby producing a torque that is operative to deflect a pointer to show the change of frequency. Preferably the inductive circuit of one coil is utilized in the resonant circuit that is in series with the other coil.

By this arrangement, an instrument is provided that gives wide deflections with small variations in frequency above or below the normal frequency, and, since practically no current flows in one winding at normal frequency, the power loss in the instrument is low.

My invention will be readily understood upon reference to the accompanying drawings in which—

Figure 1:
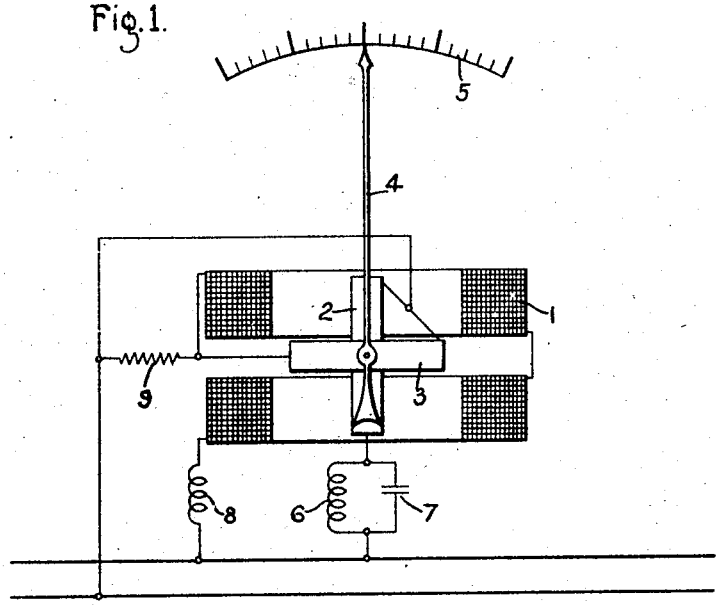
Figure 1 is a diagrammatic view of a frequency meter arranged in accordance with my invention.

In Fig. 1, the meter comprises a stationary coil 1 producing a field that acts upon two movable coils 2 and 3. The coils 2 and 3 are fastened together with their axes at right angles to each other. A pointer 4 is supported by the movable coils 2 and 3, and co-operates with a scale 5 to indicate the frequency being measured. A parallel-resonance circuit comprising an inductance 6 and a condenser 7 is connected in series with the coil 2. The values of the inductance 6 and the condenser 7 are so chosen that the circuit is resonant at the normal frequency of the meter. Thus, if the meter is a 60-cycle meter, the inductive reactance of the inductance 6 is equal to the condensive reactance of the condenser 7 at 60 cycles.

An inductance 8 is connected in series with the fixed winding 1 and movable winding 3 to limit the current to a proper value and to insure that the current is substantially 90° out of phase with the applied voltage. The coil 3, having its axis parallel to the axis of the stationary coil 1, is shunted by an adjusting resistor 9 to permit adjustment of the current and the instrument deflection to the desired value.

Figure 3:
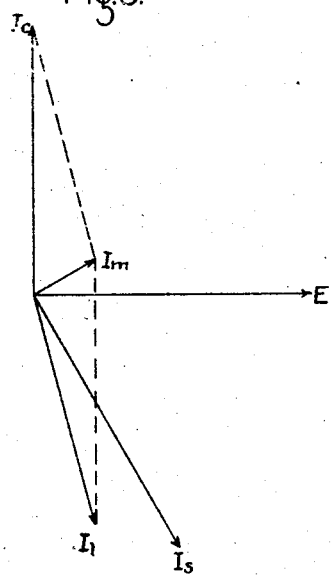
Fig. 3 is a vector diagram of the currents and voltages in the instrument at normal frequency.
Figure 4:
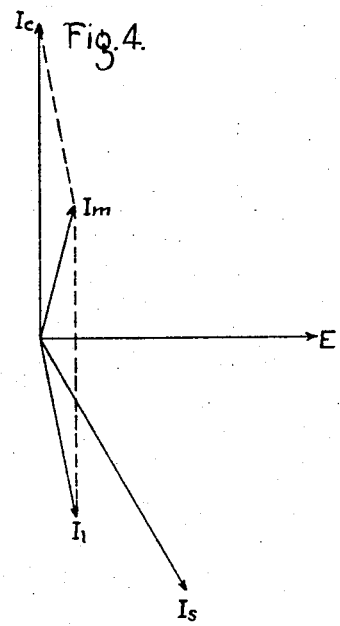
Fig. 4 is a similar diagram at a frequency above normal.
Figure 5:
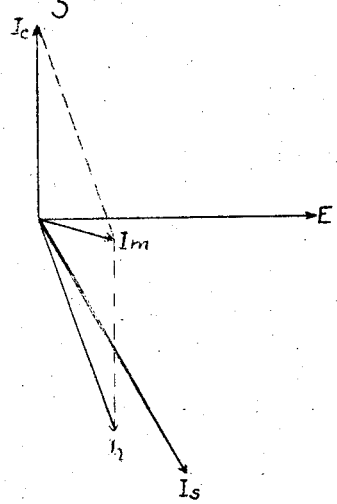
Fig. 5 is a similar diagram at a frequency below normal.

The operation of the instrument will be clear upon reference to Figs. 3, 4 and 5. E represents the applied voltage. $I_c$ is the current through the condenser 7 and is 90° out of phase with the voltage E. $I_1$ is the current through the inductance 6, which lags the applied voltage E by substantially 90° as shown. The resultant current through the movable coil 2 is represented by $I_m$. The deviation of the vector $I_1$ from the out-of-phase relation is exaggerated in Fig. 3, and, accordingly, the value of the resultant current, $I_m$, is exaggerated. Actually, the resonant circuit constitutes a high impedance and the current in the coil 2 at resonance is negligible. $I_s$ represents the current through the stationary winding 1 which lags the applied voltage by an angle approaching 90°. The torque between the two coils 1 and 2 is a function of the cosine of the angle between $I_m$ and $I_s$, and, since this angle is 90° at resonance as shown in Fig. 3, the torque is zero at the normal frequency.

As the frequency changes from the normal value, however, both the magnitude and the phase relationship of the current $I_m$ through the coil 2 change, thereby producing a torque that is effective to deflect the pointer 4. Thus, if the frequency increases, the current $I_c$ through the condenser 7 increases and the current $I_1$ through the inductance 6 decreases, as shown in Fig. 4. The resultant current $I_m$ is, therefore, greater than at the normal frequency, and the angle between $I_m$ and $I_s$ is greater than 90°. A considerable torque is, therefore, produced between the coils 1 and 2. Likewise, if the frequency decreases below normal, the current $I_c$ through the condenser 7 decreases and the current $I_1$ through the inductance 6 increases so that the magnitude and phase relation of the resultant current $I_m$, through the coil 2, changes as shown in Fig. 5. Since the angle between $I_m$ and $I_s$ is now less than 90°, a torque is exerted between the coils 1 and 2 in the direction opposite to that in the case of frequencies above normal.

The coil 3 is connected in series with the stationary coil 1 and permits calibrating the meter to secure a desired deflection for a given change of frequency. The current in the coil 3 produces a torque which opposes the torque of the coil 2. The movable member comprising the coils 2 and 3 assumes a position in which the two torques are balanced. Since the torque of the coil 3 is dependent upon the ampere turns of the coil 3, the torque, and consequently the deflection of the pointer 4 for a given change of frequency, may be adjusted by the shunt resistance of the resistor 9. In this manner, the instrument may be readily calibrated.

Figure 2:
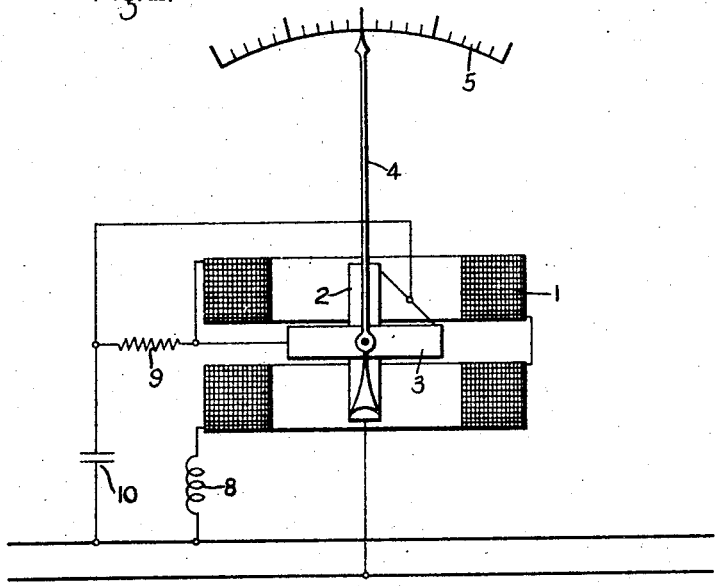
Fig. 2 is a similar view of a modified form of the meter.

A modification of the meter is shown in Fig. 2, in which the inductance of the stationary winding 1 and of the series inductance 8 is utilized for the resonant circuit, thereby eliminating the inductance 6. The meter comprises stationary and movable coils 1, 2 and 3, corresponding to the coils 1, 2 and 3 of Fig. 1. A pointer 4 is attached to the movable element and is adapted to cooperate with a scale 5. An inductance 8 is connected in series with the stationary coil 1. An adjusting resistor 9 is shunted across the terminals of the winding 3 for the calibrating purposes, as described above. A condenser 10 is shunted across the stationary coil 1 and the inductance 8, and the movable coil 2 is connected in series with the parallel-resonance circuit comprising the condenser 10, the stationary winding 1, and the inductance 8.

The capacity of the condenser 10 and the inductances of the windings 1, 3 and 8 are so chosen that the circuit is resonant at the normal frequency. This may be 60 cycles, as assumed above, or any desired frequency. The inductance 8 may be omitted for high-frequency instruments, when the inductance of the winding 1 is sufficient. With this construction, the same results are obtained as in the meter first described, the theory of operation being the same as that set forth in connection with Figs. 3, 4 and 5.

It will be apparent that I have provided a frequency meter that is sensitive to small variations of frequency. Since at normal frequency, the current through one winding is a minimum, the power consumption of the instrument is much smaller than has heretofore been obtained.

I do not consider that my invention is restricted to the precise construction shown and described, and, accordingly I do not wish to be limited except as set forth in the appended claims. For instance, although, I have described meters comprising one stationary coil and two movable coils, it is evident that the stationary coil may be made movable and the movable coils stationary, since it is the relative torque that depends upon the frequency and causes the deflection of the pointer.

I claim:

1. A frequency meter comprising relatively movable elements, one of said elements including two angularly displaced windings, and means connected in series with one of said windings to cause the current therethrough to be a minimum at substantially the average value of frequency measured.

2. A frequency meter comprising a stationary coil, a movable coil, a pointer actuated by the movable coil, and means connected in series with the movable coil to cause the current therethrough to be a minimum at substantially the average value of frequency measured.

3. A frequency meter comprising a stationary coil, a movable element including two coils having their axes parallel to and perpendicular to the axis of the stationary coil respectively, means connected in series with the perpendicular coil to cause the current therethrough to be a minimum and 90° out of phase with the current through the stationary coil at substantially the average frequency measured, and means including the parallel coil for adjusting the deflections of the meter.

4. A frequency meter comprising two relatively movable conducting elements, means for supporting said elements so that a relative torque is exerted when current is applied thereto, and means to cause the currents in the two elements to be 90° out of phase and the ratio of the currents a minimum at substantially the average frequency measured whereby the torque is a minimum at this frequency.

5. A frequency meter comprising a stationary coil, a movable coil, and a parallel-resonance circuit in series with said movable coil, a part of the inductance of said resonant circuit being comprised in the stationary coil winding.

6. A frequency meter comprising a stationary coil, a movable coil having its axis at right angles to the axis of the stationary coil, and a condenser connected in shunt to the stationary coil, both the condenser and the stationary coil being connected in series with the movable coil.

7. A frequency meter comprising a stationary coil, a movable element including two coils having their axes parallel to and perpendicular to the axis of the stationary coil respectively, and a condenser connected in shunt to the stationary coil, both the condenser and the stationary coil being connected in series with the perpendicular coil and the parallel coil being connected in series with the stationary coil.

8. A frequency meter comprising two relatively movable coils, and means responsive to a change of the frequency of the applied voltage for simultaneously varying the value and phase relation of the current through one of said coils, said means comprising a resonant circuit including a condenser and the other of said coils.

In testimony whereof, I have hereunto subscribed my name this 27th day of May, 1924.

BERNARD E. LENEHAN.